United States Patent
Hsu et al.

(10) Patent No.: US 8,053,928 B2
(45) Date of Patent: Nov. 8, 2011

(54) POWER CONVERSION CIRCUIT FOR REDUCING POWER LOSS AND ELECTRONIC DEVICE HAVING SUCH POWER CONVERSION CIRCUIT

(75) Inventors: Jui-Yuan Hsu, Taoyuan Hsien (TW); Liang-Wei Lu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 299 days.

(21) Appl. No.: 12/414,337

(22) Filed: Mar. 30, 2009

(65) Prior Publication Data

US 2009/0251010 A1    Oct. 8, 2009

(30) Foreign Application Priority Data

Apr. 8, 2008    (TW) .............................. 97112688 A

(51) Int. Cl.
*H02J 5/00*    (2006.01)
(52) U.S. Cl. ...................................................... 307/80
(58) Field of Classification Search .................... 307/80, 307/125–131; 700/286, 295; 713/323, 320, 713/300
See application file for complete search history.

(56) References Cited

U.S. PATENT DOCUMENTS

| | | | |
|---|---|---|---|
| 5,621,300 A * | 4/1997 | Sato et al. ...................... | 320/101 |
| 7,373,222 B1 * | 5/2008 | Wright et al. .................. | 700/295 |
| 7,535,118 B2 * | 5/2009 | Ikuma et al. .................... | 307/38 |
| 7,698,585 B2 * | 4/2010 | Malik et al. .................... | 713/320 |
| 7,830,041 B2 * | 11/2010 | Yang et al. ...................... | 307/115 |

* cited by examiner

*Primary Examiner* — Albert W Paladini

(57) ABSTRACT

A power conversion circuit includes a driving circuit, an activating circuit, a converter and an auxiliary power source. The activating circuit receives a first power signal. The converter is used for converting the first power signal into a second power signal. The auxiliary power source is electrically connected to the activating circuit and the driving circuit. The auxiliary power source is driven by the driving circuit to issue either a first control signal to the activating circuit if the load is connected with the power conversion circuit or a second control signal to the activating circuit if the load is disconnected from the power conversion circuit. In response to the first control signal, the first power signal is converted into the second power signal and the second power signal is transmitted to the load. In response to the second control signal, the converter is disenabled.

20 Claims, 9 Drawing Sheets

POWER CONVERSION CIRCUIT FOR REDUCING POWER LOSS AND ELECTRONIC DEVICE HAVING SUCH POWER CONVERSION CIRCUIT

CLAIM OF PRIORITY UNDER 35 U.S.C. §119

This application claims priority to Taiwanese Patent Application No. 097112688 filed on Apr. 8, 2008.

FIELD OF THE INVENTION

The present invention relates to a power conversion circuit, and more particularly to a power conversion circuit for reducing power loss. The present invention also relates to an electronic device having such a power conversion circuit.

BACKGROUND OF THE INVENTION

Recently, power adapters become indispensable devices for many kinds of electronic devices. A power adapter usually has an AC-to-DC converter for rectifying and converting utility power into DC power required for powering a load such as a notebook computer or a mobile phone charger.

Referring to FIG. 1, a schematic circuit block diagram of a typical power supply system is illustrated. The power adapter 10 has a first terminal connected to utility power source 11 through an AC plug (not shown) and a second terminal connected to a load 12 through a connector (not shown). Within the power adapter 10, an AC-to-DC converter 101 is used for receiving the AC power from the utility power source 11 and rectifying and converting the utility power into DC power required for powering the load 12.

Although the AC-to-DC converter 101 of the power adapter 10 can rectify and convert the utility power into the DC power required for powering the load 12, there are still some drawbacks. For example, for carrying the load 12 (for example a portable electronic device such as a notebook computer) to other places, the user may simply separate the load 12 from the power adapter 10 while the power adapter 10 is still connected to the utility power source 11. Under this circumstance, the utility power is continuously transmitted from the utility power source 11 to the power adapter 10. Due to the line impedance between the utility power source 11 and the power adapter 10 or the continuous conversion of the AC power into DC power by the power adapter 10, the power adapter 10 is readily suffered from additional power loss. Nowadays, with increasing awareness of environmental protection, more and more products are designed in views of low power consumption, low power loss and high performance. As a result, the current power adapter is not satisfied.

Therefore, there is a need of providing a power conversion circuit for reducing power loss to obviate the drawbacks encountered from the prior art.

SUMMARY OF THE INVENTION

It is an object of the present invention to provide a power conversion circuit for reducing power loss due to the line impedance between the utility power source and the power adapter or the continuous conversion of the AC power into DC power by the power adapter when the power adapter is disconnected from the load.

Another object of the present invention is to provide an electronic device having such a power conversion circuit.

In accordance with an aspect of the present invention, there is provided a power conversion circuit for converting a first power signal from a power source into a second power signal required for a load. The power conversion circuit includes a driving circuit, an activating circuit, a converter and an auxiliary power source. The converter is electrically connected to the power source for receiving the first power signal and converting the first power signal into the second power signal. The activating circuit is connected to the converter for enabling or disenabling the converter to convert the first power signal into the second power signal. The auxiliary power source is electrically connected to the activating circuit and the driving circuit, and driven by the driving circuit to issue either a first control signal to the activating circuit if the load is connected with the power conversion circuit or a second control signal to the activating circuit if the load is disconnected from the power conversion circuit. In response to the first control signal, the first power signal is converted into the second power signal by the converter and the second power signal is transmitted to the load. In response to the second control signal, the converter is disenabled so as to reduce power loss of the first power signal.

In accordance with another aspect of the present invention, there is provided a power conversion circuit for converting a first power signal from a power source into a second power signal required for a load. The power conversion circuit includes a driving circuit, an activating circuit, a converter and an auxiliary power source. The activating circuit is employed for receiving the first power signal. The converter is electrically connected to the activating circuit for converting the first power signal into the second power signal. The auxiliary power source is electrically connected to the activating circuit and the driving circuit, and driven by the driving circuit to issue either a first control signal to the activating circuit if the load is connected with the power conversion circuit or a second control signal to the activating circuit if the load is disconnected from the power conversion circuit. In response to the first control signal, the first power signal is transmitted to the converter through the activating circuit to be converted into the second power signal by the converter and the second power signal is transmitted to the load. In response to the second control signal, the activating circuit is disconnected from the converter so as to reduce power loss of the first power signal.

In accordance with another aspect of the present invention, there is provided an electronic device. The electronic device includes a system operation module and a power conversion circuit. The power conversion circuit is electrically connected to the system operation module for converting a first power signal from a power source into a second power signal required for the system operation module. The power conversion circuit includes a converter electrically connected to the power source for receiving the first power signal and converting the first power signal into the second power signal, a driving circuit, an activating circuit connected with the converter, and an auxiliary power source electrically connected to the activating circuit and the driving circuit. The auxiliary power source is driven by the driving circuit to issue either a first control signal to the activating circuit if the system operation module is in an operating mode or a second control signal to the activating circuit if the system operation module is in a suspending mode. In response to the first control signal, the first power signal is converted into the second power signal by the converter and the second power signal is transmitted to the system operation module. In response to the second control signal, the converter is disenabled or the activating circuit is disconnected from the converter.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
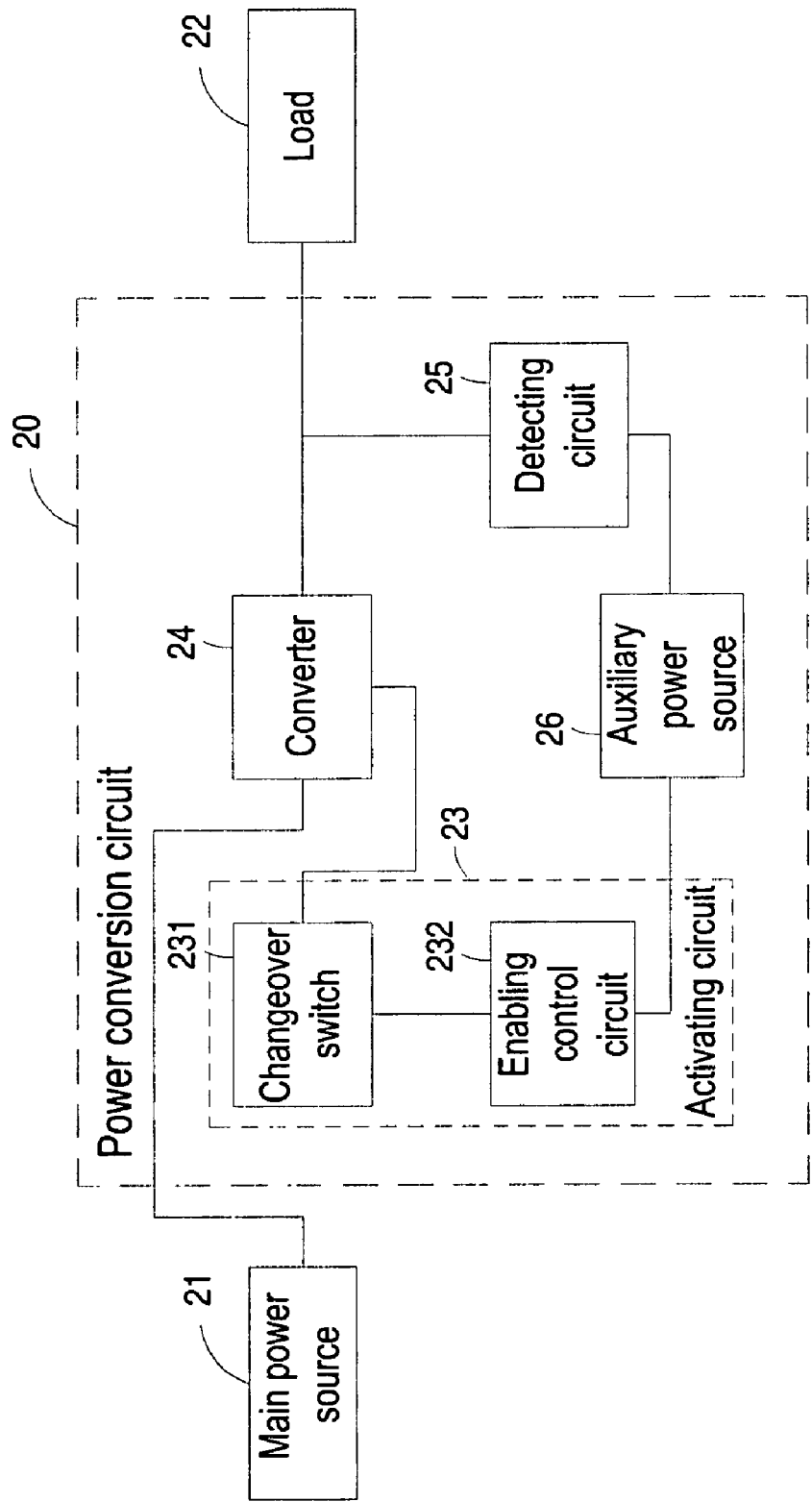
FIG. 2 is a schematic circuit block diagram of a power conversion circuit for reducing power loss according to a first preferred embodiment of the present invention.

FIG. 2 is a schematic circuit block diagram of a power conversion circuit for reducing power loss according to a first preferred embodiment of the present invention. The power conversion circuit 20 is applicable to for example a power adapter. Both terminals of the power conversion circuit 20 are electrically connected to a main power source 21 and a load 22, respectively. By the power conversion circuit 20, a first power signal outputted from the main power source 21 is converted to a second power signal required for the load 22. In this embodiment, the first power signal is an AC signal, the second power signal is a DC signal, and the main power source 21 is a utility power source. An example of the load 22 includes but is not limited to a notebook.

Please refer to FIG. 2 again. The power conversion circuit 20 of the present invention further comprises an activating circuit 23, a converter 24, a driving circuit (e.g. a detecting circuit 25) and an auxiliary power source 26. The activating circuit 23 is electrically connected to the converter 24 and the auxiliary power source 26. The auxiliary power source 26 can provide power to the activating circuit 23 to control operations of the converter 24, thereby discriminating whether the first power signal provided by the main power source 21 is converted into the second power signal. In this embodiment, the activating circuit 23 comprises a changeover switch 231 and an enabling control circuit 232. The changeover switch 231 is selectively conducted (on status) or shut off (off status) under control of the enabling control circuit 232, thereby enabling or disenabling the converter 24. The enabling control circuit 232 is electrically connected to the changeover switch 231 and the auxiliary power source 26. The on/off statuses of the changeover switch 231 are controlled by the auxiliary power source 26.

The converter 24 is electrically connected to the main power source 21, the detecting circuit 25 and the load 22. The converter 24 is selectively connected to the changeover switch 231 of the activating circuit 23. When the changeover switch 231 is in the on status such that the activating circuit 23 is connected with the converter 24, the converter 24 is activated. By the converter 24, the first power signal provided by the main power source 21 is converted into the second power signal to be used in the load 22. In some embodiments, the converter 24 includes but is not limited to an AC-to-DC converter.

The detecting circuit 25 is electrically connected to the converter 24, and the auxiliary power source 26. The detecting circuit 25 can automatically detect whether the load 22 is electrically connected to the converter 24. According to the detecting result, a control signal is transmitted from the auxiliary power source 26 to the activating circuit 23.

The auxiliary power source 26 is electrically connected to the activating circuit 23 and the detecting circuit 25. According to the detecting result of the detecting circuit 25, the auxiliary power source 26 issues the control signal to the activating circuit 23. In some embodiments, the auxiliary power source 26 is a replaceable battery.

Hereinafter, the operation principles of the power conversion circuit 20 according to the first preferred embodiment of the present invention will be illustrated in more details with reference to FIG. 2.

If the power conversion circuit 20 is connected with the main power source 21 and the load 22, the detecting circuit 25 detects connection between the main power source 21 and the load 22 and thus the auxiliary power source 26 issues a first control signal to the enabling control circuit 232 of the activating circuit 23. In response to the first control signal, the changeover switch 231 is conducted under control of the enabling control circuit 232. Under this circumstance, the first power signal provided by the main power source 21 is converted into the second power signal by converter 24 and the second power signal is transmitted to the load 22.

If the detecting circuit 25 detects that the power conversion circuit 20 is disconnected from the load 22, the auxiliary power source 26 issues a second control signal to the enabling control circuit 232 of the activating circuit 23. In response to the second control signal, the changeover switch 231 is shut off under control of the enabling control circuit 232. Therefore, the first power signal provided by the main power source 21 fails to be converted into the second power signal by converter 24. Under this circumstance, the power loss of the first power signal is reduced.

In the above embodiment, the activating circuit 23 comprises the changeover switch 231 and the enabling control circuit 232. Alternatively, the activating circuit 23 may comprise only the changeover switch 231 but the changeover switch 231 should be selectively conducted or shut off in response to the first or second control signal issued from the auxiliary power source 26. In some embodiments, the auxiliary power source 26 is a chargeable battery, which is electrically connected to the converter 24 via an additional electrical wire. As a consequence, the second power signal provided by the converter 24 may charge the auxiliary power source 26 while transmitting to the load 22.

Figure 1:
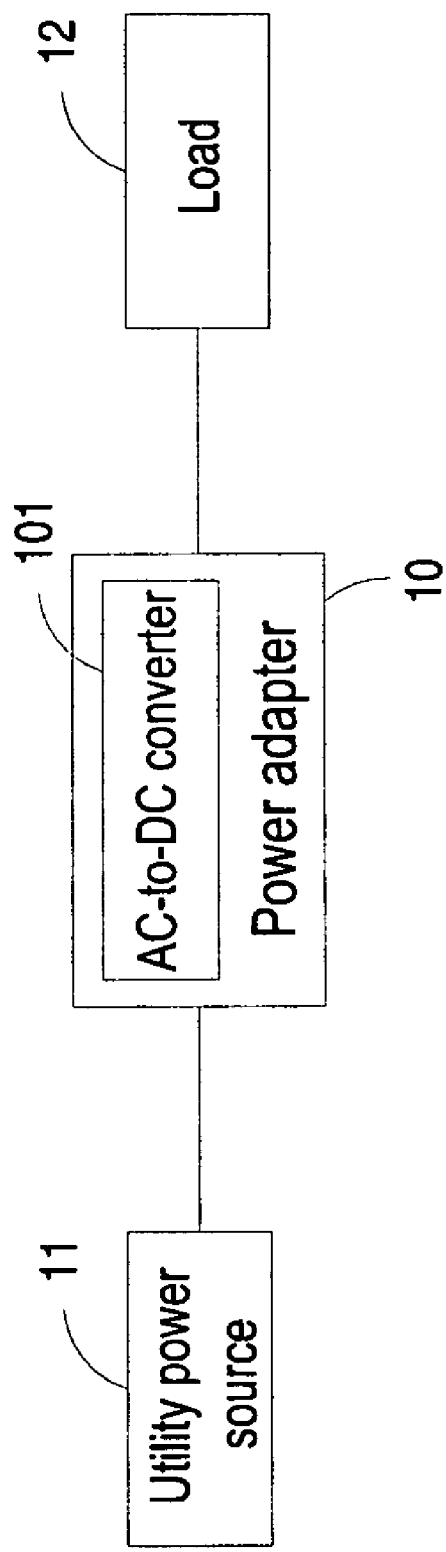
FIG. 1 is a schematic circuit block diagram of a typical power supply system.
Figure 3:
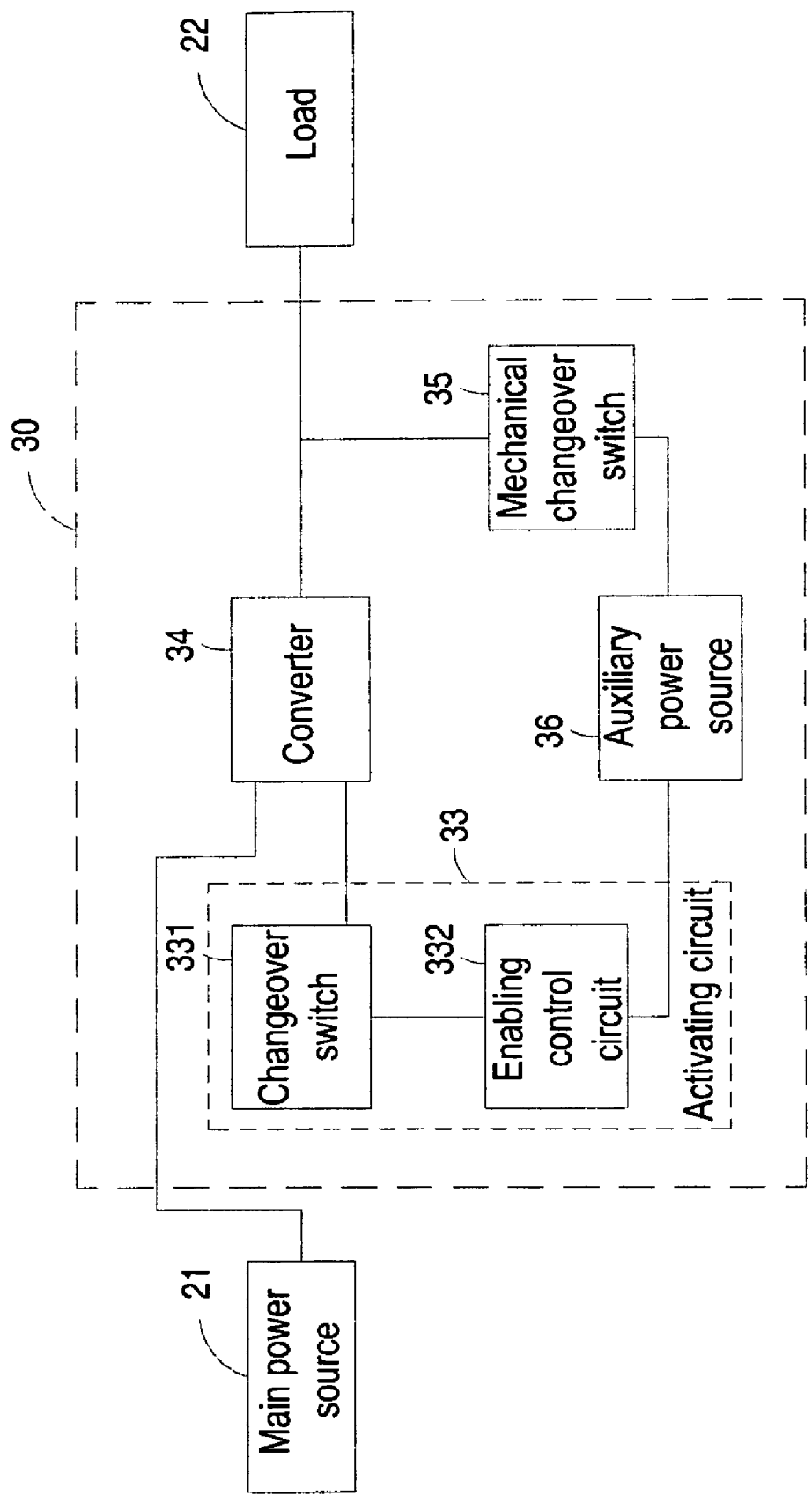
FIG. 3 is a schematic circuit block diagram of a power conversion circuit for reducing power loss according to a second preferred embodiment of the present invention.

FIG. 3 is a schematic circuit block diagram of a power conversion circuit for reducing power loss according to a second preferred embodiment of the present invention. Both terminals of the power conversion circuit 30 are electrically connected to a main power source 21 and a load 22, respectively. By the power conversion circuit 30, a first power signal outputted from the main power source 21 is converted to a second power signal required for the load 22. The functions and operation principles of the activating circuit 33, the converter 34, and the auxiliary power source 36 included in the power conversion circuit 30 of this embodiment are similar to those shown in FIG. 1, and are not redundantly described herein.

The major difference between the power conversion circuit 30 of FIG. 3 and the power conversion circuit 20 of FIG. 2 is that the driving circuit is a mechanical changeover switch 35. The mechanical changeover switch 35 is electrically connected to the auxiliary power source 36. If the power conversion circuit 30 is connected with the main power source 21 and the load 22, the user needs to switch the mechanical changeover switch 35 to an on status. When the mechanical changeover switch 35 is in the on status, the auxiliary power source 36 issues a first control signal to the enabling control circuit 332 of the activating circuit 33. In response to the first control signal, the changeover switch 331 is conducted under control of the enabling control circuit 332. Under this circumstance, the first power signal provided by the main power source 21 is converted into the second power signal by converter 34 and the second power signal is transmitted to the load 32. In another case that the power conversion circuit 30 is disconnected from the load 22, the user needs to switch the mechanical changeover switch 35 to an off status. In response to the second control signal, the changeover switch 331 is shut off under control of the enabling control circuit 332. Therefore, the first power signal provided by the main power source 21 fails to be converted into the second power signal by converter 34. Under this circumstance, the power loss of the first power signal is reduced.

Figure 4:
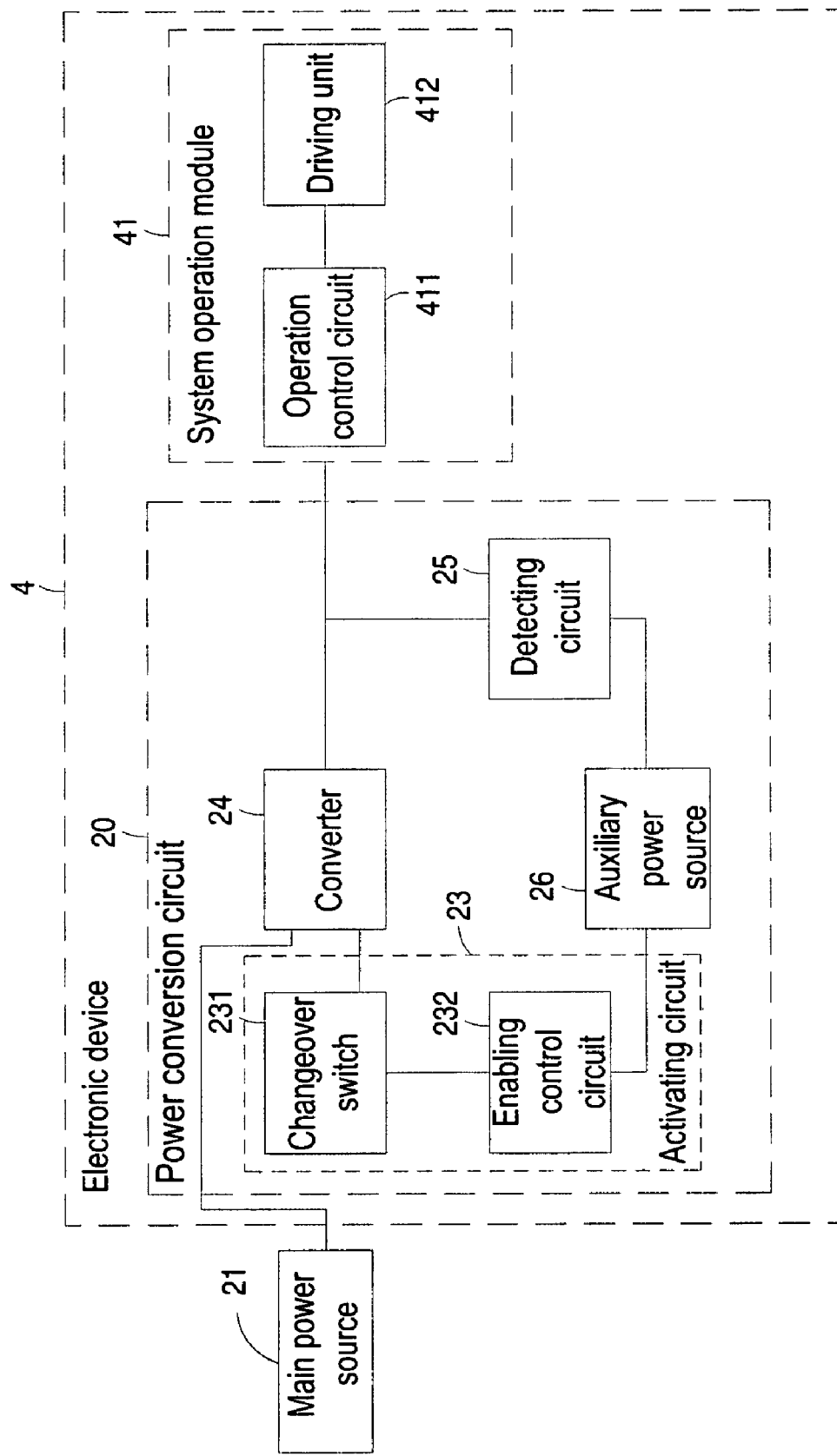
FIG. 4 is a schematic circuit block diagram of an electronic device according to a third preferred embodiment of the present invention.

FIG. 4 is a schematic circuit block diagram of an electronic device according to a third preferred embodiment of the present invention. As shown in FIG. 4, the electronic device 4 is electrically connected to a main power source 21. A first power signal outputted from the main power source 21 is provided to the electronic device 4. The electronic device 4 principally comprises a power conversion circuit 20 and a system operation module 41. Both terminals of the power conversion circuit 20 are electrically connected to the main power source 21 and the system operation module 41, respectively. By the power conversion circuit 20, the first power signal outputted from the main power source 21 is converted to a second power signal required for the system operation module 41. In receipt of the second power signal, the system operation module 41 implements predefined functions of the electronic device 4. In this embodiment, the system operation module 41 comprises an operation control circuit 411 and a driving unit 412. The driving unit 412 is electrically connected to the operation control circuit 411. By triggering the driving unit 412, the user may power on or off the electronic device 4. When the electronic device 4 is powered on, the system operation module 41 implements predefined functions of the electronic device 4 under control of the operation control circuit 411. In addition to the operation control circuit 411 and a driving unit 412, the system operation module 41 may comprises other components according to the practical requirements.

The power conversion circuit 20 of the present invention comprises an activating circuit 23, a converter 24, a driving circuit (e.g. a detecting circuit 25) and an auxiliary power source 26. The activating circuit 23 comprises a changeover switch 231 and an enabling control circuit 232. The layout configurations, functions and operation principles of the activating circuit 23, the converter 24 and the auxiliary power source 26 are similar to those shown in FIG. 1, and are not redundantly described herein. In this embodiment, the converter 24 is further electrically connected to the system operation module 41. By the converter 24, the first power signal outputted from the main power source 21 is converted to the second power signal required for the system operation module 41. In addition, the detecting circuit 25 is also electrically connected to the system operation module 41. According to the operating statuses of the system operation module 41, the detecting circuit 25 issues a first control signal or a second control signal.

Hereinafter, the operation principles of the electronic device 4 will be illustrated in more details with reference to FIG. 4.

If the user intends to use the electronic device 4, the user may trigger the driving unit 412 to generate an on triggering signal. In response to the on triggering signal, the operation control circuit 411 controls operations of the system operation module 41. Meanwhile, the detecting circuit 25 detects a signal indicating that the system operation module 41 is in an operating mode, and thus the auxiliary power source 26 issues a first control signal to the enabling control circuit 232 of the activating circuit 23. In response to the first control signal, the changeover switch 231 is conducted under control of the enabling control circuit 232. Under this circumstance, the first power signal provided by the main power source 21 is converted into the second power signal by converter 24 and the second power signal is transmitted to the system operation module 41.

If the user intends to power off the electronic device 4, the user may trigger the driving unit 412 to generate an off triggering signal. In response to the off triggering signal, the operation control circuit 411 controls suspension of the system operation module 41. Meanwhile, the detecting circuit 25 detects a signal indicating that the system operation module 41 is in a suspending mode, and thus the auxiliary power source 26 issues a second control signal to the enabling control circuit 232 of the activating circuit 23. In response to the second control signal, the changeover switch 231 is shut off under control of the enabling control circuit 232. Therefore, the first power signal provided by the main power source 21 fails to be converted into the second power signal by converter 24. That is, the power loss of the first power signal is reduced when the electronic device 4 is powered off.

An example of the electronic device 4 includes but is not limited to a TV set. The driving unit 412 of the system operation module 41 includes but is not limited to a power button or a remotely controlled signal receiving device.

Figure 5:
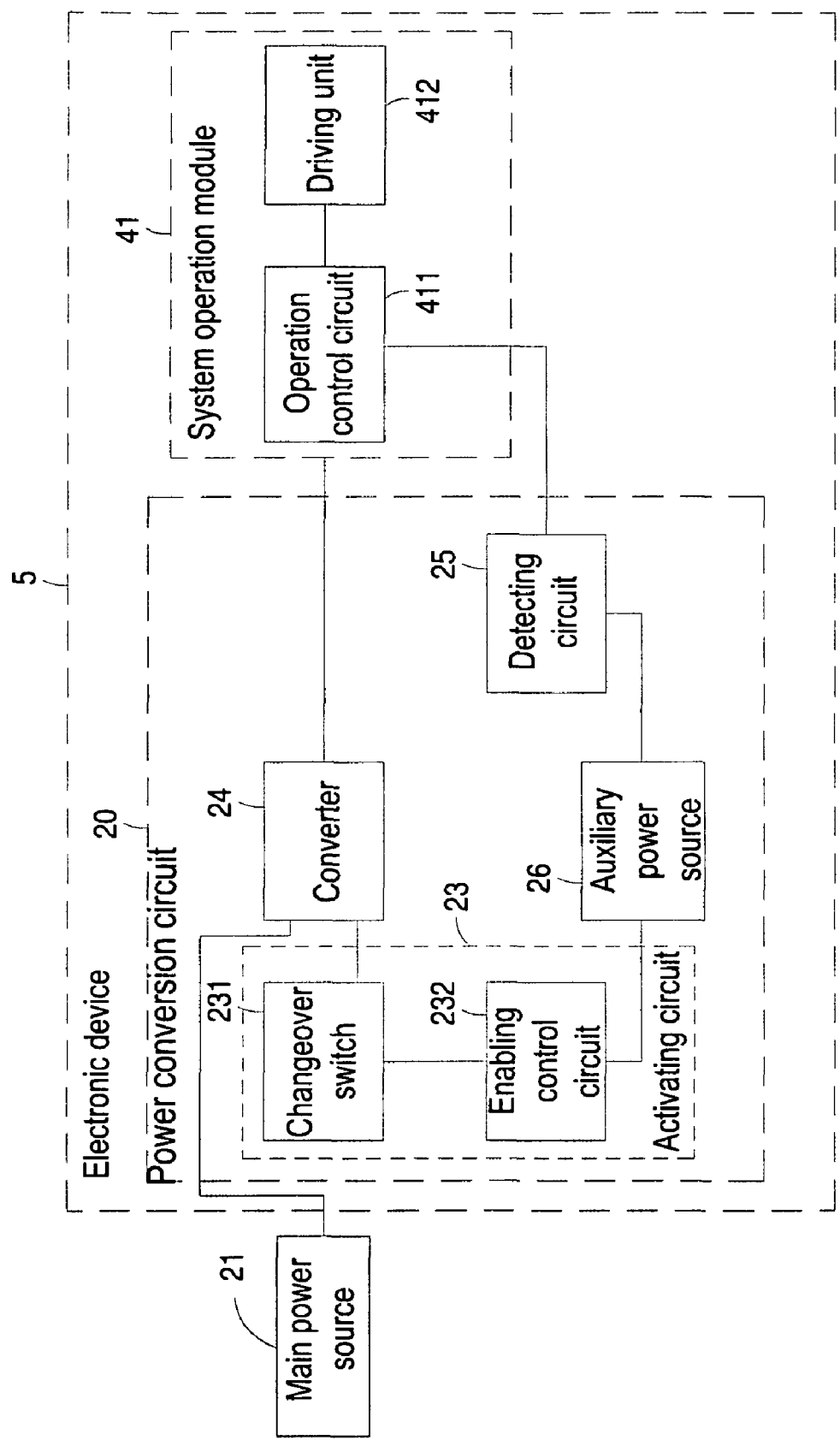
FIG. 5 is a schematic circuit block diagram of an electronic device according to a fourth preferred embodiment of the present invention.

FIG. 5 is a schematic circuit block diagram of an electronic device according to a fourth preferred embodiment of the present invention. In this embodiment, the detecting circuit 25 of the power conversion circuit 20 is also connected to the operation control circuit 411 of the system operation module 41, so that the on triggering signal or the off triggering signal may be transmitted from the driving unit 412 to the detecting circuit 25. The layout configurations, functions and operation principles of the activating circuit 23, the converter 24 and the auxiliary power source 26 are similar to those shown in FIG. 4, and are not redundantly described herein.

Figure 6:
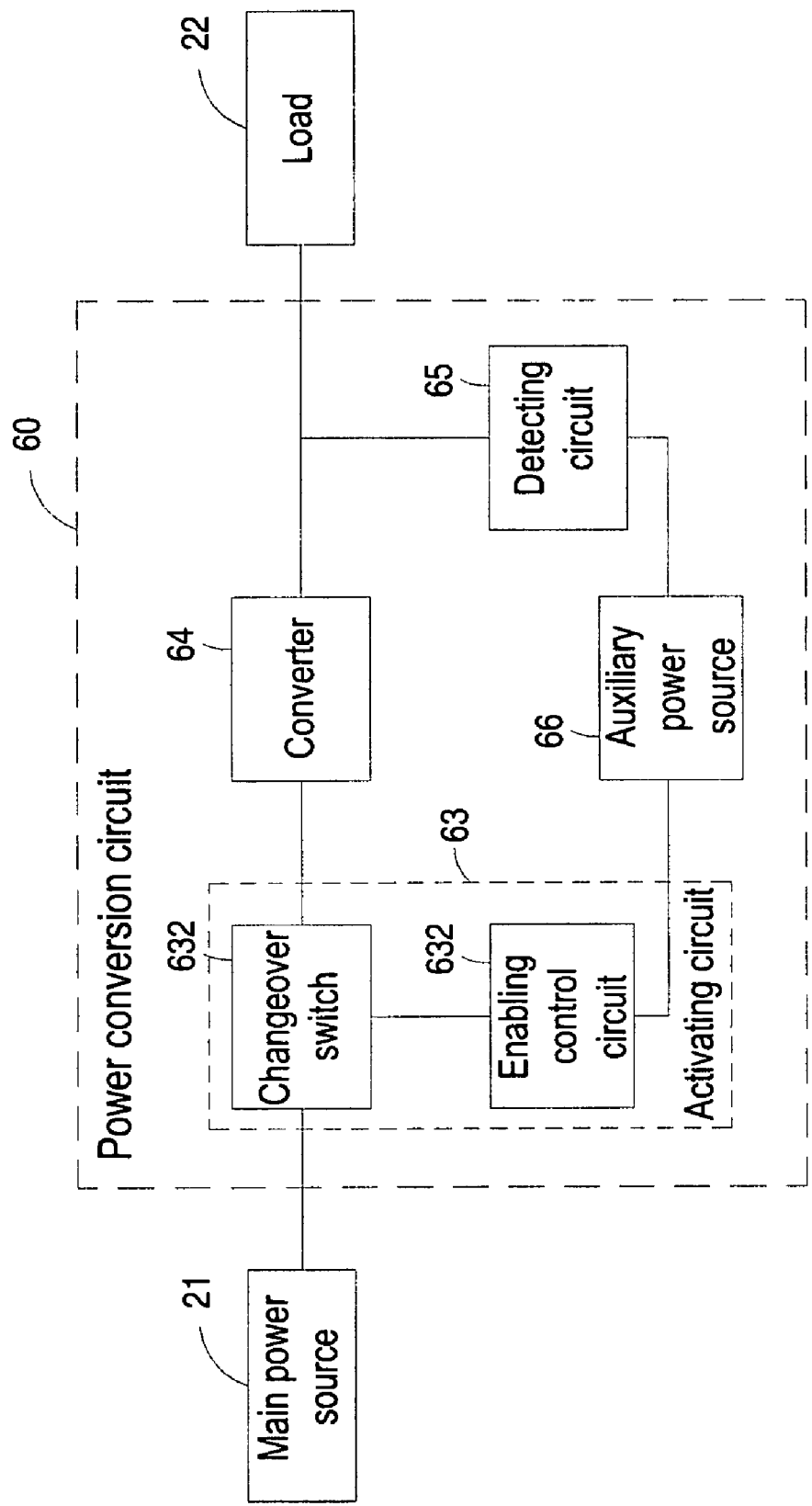
FIG. 6 is a schematic circuit block diagram of a power conversion circuit for reducing power loss according to a fifth preferred embodiment of the present invention.

FIG. 6 is a schematic circuit block diagram of a power conversion circuit for reducing power loss according to a fifth preferred embodiment of the present invention. Both terminals of the power conversion circuit 60 are electrically connected to a main power source 21 and a load 22, respectively. By the power conversion circuit 60, a first power signal outputted from the main power source 21 is converted to a second power signal required for the load 22. The power conversion circuit 60 of FIG. 6 comprises an activating circuit 63, a converter 64, a driving circuit (e.g. a detecting circuit 65) and an auxiliary power source 66. The functions and operation principles of the detecting circuit 65 and the auxiliary power source 66 are similar to those shown in FIG. 1, and are not redundantly described herein.

In this embodiment, the activating circuit 63 is electrically connected to the main power source 21 and the auxiliary power source 26. The auxiliary power source 26 can provide power to the activating circuit 23 to control connection or disconnection between the main power source 21 and the converter 64, thereby discriminating whether the first power signal provided by the main power source 21 is converted into the second power signal. In this embodiment, the activating circuit 63 comprises a changeover switch 631 and an enabling control circuit 632. The changeover switch 631 is connected to the enabling control circuit 632 and the main power source 21. The changeover switch 631 is selectively conducted (on status) or shut off (off status) under control of the enabling control circuit 632, so that the converter 64 is selectively connected with or disconnected from the main power source 21.

If the power conversion circuit 60 is connected with the main power source 21 and the load 22, the detecting circuit 65 detects connection between the main power source 21 and the load 22 and thus the auxiliary power source 66 issues a first control signal to the enabling control circuit 632 of the activating circuit 63. In response to the first control signal, the changeover switch 631 is conducted under control of the enabling control circuit 632. Under this circumstance, the first power signal provided by the main power source 21 is converted into the second power signal by converter 64 and the second power signal is transmitted to the load 22.

If the power conversion circuit 60 detects that the power conversion circuit 60 is disconnected from the load 22, the auxiliary power source 66 issues a second control signal to the enabling control circuit 632 of the activating circuit 63. In response to the second control signal, the changeover switch 631 is shut off under control of the enabling control circuit 632. Therefore, the first power signal provided by the main power source 21 fails to be converted into the second power signal by converter 24. Under this circumstance, the power loss of the first power signal is reduced.

Figure 7:
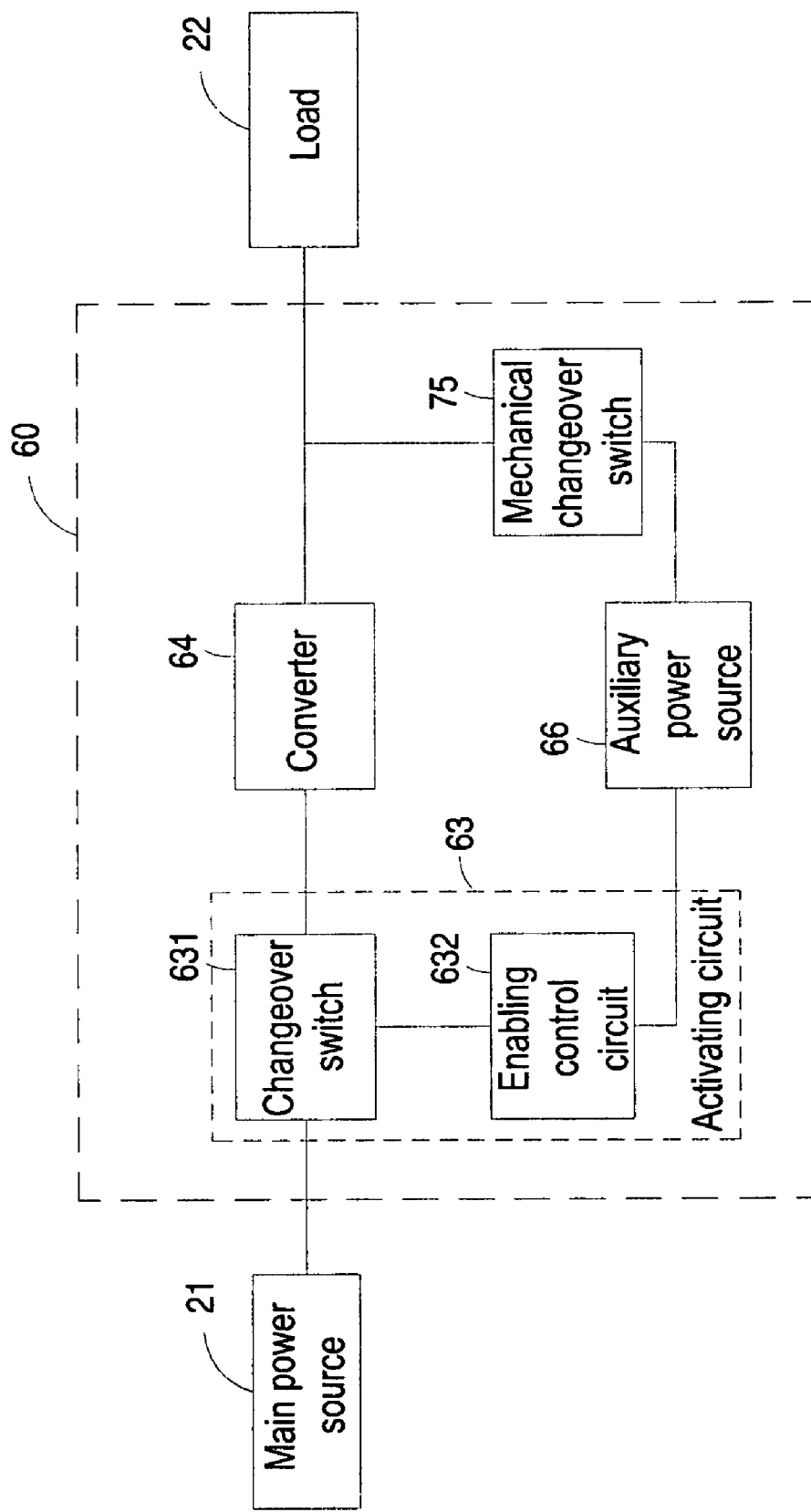
FIG. 7 is a schematic circuit block diagram of a power conversion circuit for reducing power loss according to a sixth preferred embodiment of the present invention.

FIG. 7 is a schematic circuit block diagram of a power conversion circuit for reducing power loss according to a sixth preferred embodiment of the present invention. Both terminals of the power conversion circuit 60 are electrically connected to a main power source 21 and a load 22, respectively. By the power conversion circuit 60, a first power signal outputted from the main power source 21 is converted to a second power signal required for the load 22. The layout configuration, functions and operation principles of the activating circuit 63, the converter 64, the driving circuit and the auxiliary power source 66 included in the power conversion circuit 60 of this embodiment are similar to those shown in FIG. 6, and are not redundantly described herein. The major difference between the power conversion circuit 60 of FIG. 7 and the power conversion circuit 60 of FIG. 6 is that the driving circuit is a mechanical changeover switch 75. The mechanical changeover switch 75 is electrically connected to the auxiliary power source 66. If the power conversion circuit 60 is connected with the main power source 21 and the load 22, the user needs to switch the mechanical changeover switch 75 to an on status. When the mechanical changeover switch 75 is in the on status, the auxiliary power source 66 issues a first control signal to the enabling control circuit 632 of the activating circuit 63. In response to the first control signal, the changeover switch 631 is conducted under control of the enabling control circuit 632. Under this circumstance, the first power signal provided by the main power source 21 is converted into the second power signal by converter 64 and the second power signal is transmitted to the load 22. In another case that the power conversion circuit 60 is disconnected from the load 22, the user needs to switch the mechanical changeover switch 75 to an off status. In response to the second control signal, the changeover switch 631 is shut off under control of the enabling control circuit 632. Therefore, the first power signal provided by the main power source 21 fails to be converted into the second power signal by converter 64. Under this circumstance, the power loss of the first power signal is reduced.

Figure 8:
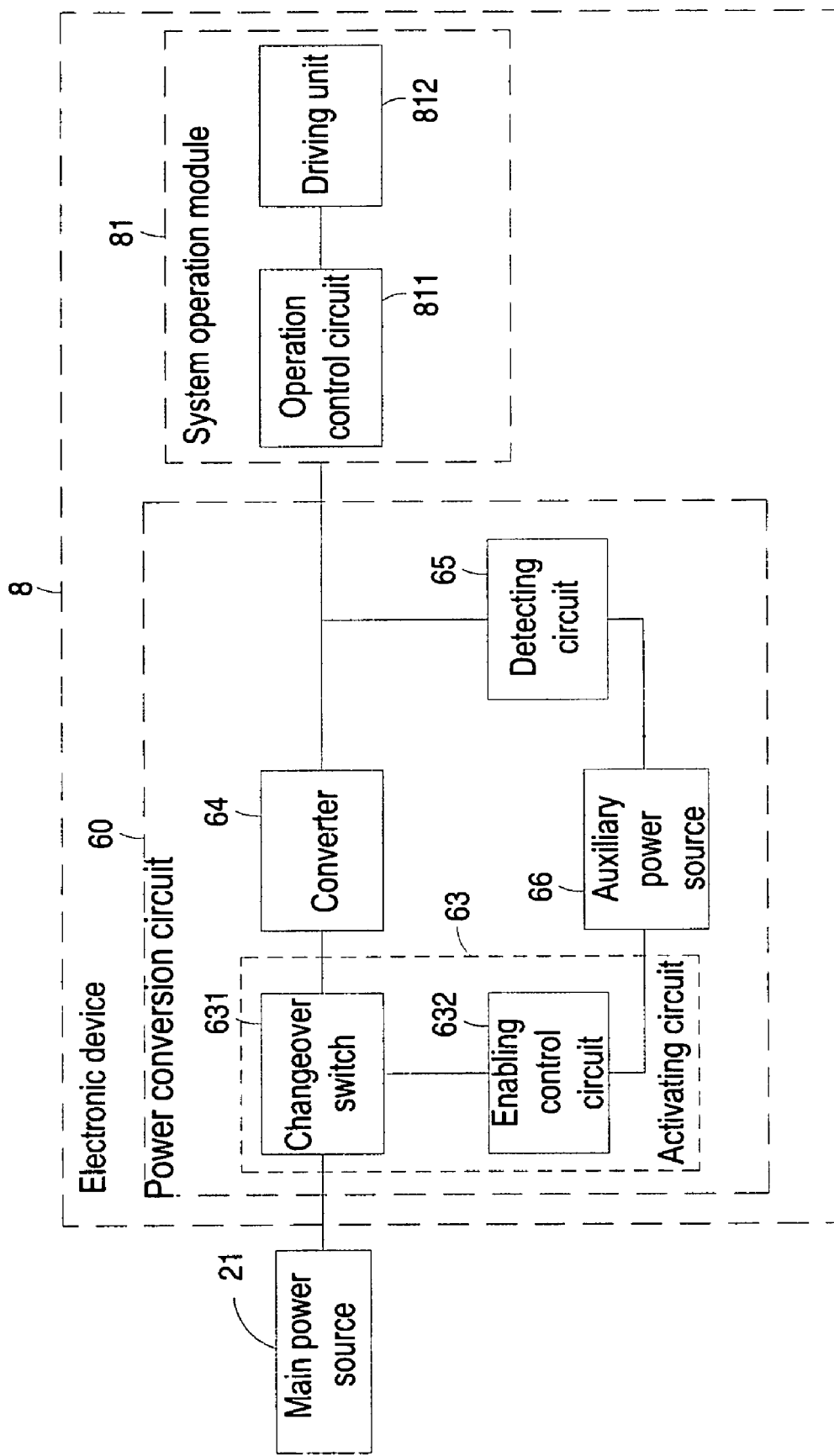
FIG. 8 is a schematic circuit block diagram of an electronic device according to a seventh preferred embodiment of the present invention.

FIG. 8 is a schematic circuit block diagram of an electronic device according to a seventh preferred embodiment of the present invention. As shown in FIG. 8, the electronic device 8 is electrically connected to a main power source 21. A first power signal outputted from the main power source 21 is provided to the electronic device 8. The electronic device 8 principally comprises a power conversion circuit 60 and a system operation module 81. Both terminals of the power conversion circuit 60 are electrically connected to the main power source 21 and the system operation module 81, respectively. By the power conversion circuit 60, the first power signal outputted from the main power source 21 is converted to a second power signal required for the system operation module 81. In receipt of the second power signal, the system operation module 81 implements predefined functions of the electronic device 8. In this embodiment, the system operation module 81 comprises an operation control circuit 811 and a driving unit 812. The functions and operation principles of the operation control circuit 811 and the driving unit 81 included in the electronic device 8 of this embodiment are similar to those shown in FIG. 4, and are not redundantly described herein.

The power conversion circuit 60 of this embodiment comprises an activating circuit 63, a converter 64, a driving circuit (e.g. a detecting circuit 65) and an auxiliary power source 66. The activating circuit 63 comprises a changeover switch 631 and an enabling control circuit 632. The layout configurations, functions and operation principles of the activating circuit 63, the converter 64 and the auxiliary power source 66 are similar to those shown in FIG. 6, and are not redundantly described herein. In this embodiment, the converter 64 is further electrically connected to the system operation module 81. By the converter 64, the first power signal outputted from the main power source 21 is converted to the second power signal required for the system operation module 81. In addition, the detecting circuit 65 is also electrically connected to the system operation module 81. According to the operating statuses of the system operation module 81, the detecting circuit 65 issues a first control signal or a second control signal.

Hereinafter, the operation principles of the electronic device 8 will be illustrated in more details with reference to FIG. 8.

If the user intends to use the electronic device 8, the user may trigger the driving unit 812 to generate an on triggering signal. In response to the on triggering signal, the operation control circuit 611 controls operations of the system operation module 81. Meanwhile, the detecting circuit 65 detects a signal indicating that the system operation module 81 is in an operating mode, and thus the auxiliary power source 66 issues a first control signal to the enabling control circuit 632 of the activating circuit 63. In response to the first control signal, the changeover switch 631 is conducted under control of the enabling control circuit 632. Under this circumstance, the first power signal provided by the main power source 21 is converted into the second power signal by converter 64 and the second power signal is transmitted to the system operation module 61.

If the user intends to power off the electronic device 8, the user may trigger the driving unit 812 to generate an off triggering signal. In response to the off triggering signal, the operation control circuit 811 controls suspension of the system operation module 81. Meanwhile, the detecting circuit 65 detects a signal indicating that the system operation module 81 is in a suspending mode, and thus the auxiliary power source 66 issues a second control signal to the enabling control circuit 632 of the activating circuit 63. In response to the second control signal, the changeover switch 631 is shut off under control of the enabling control circuit 632. Therefore, the first power signal provided by the main power source 21 fails to be converted into the second power signal by converter 64. That is, the power loss of the first power signal is reduced when the electronic device 8 is powered off.

Figure 9:
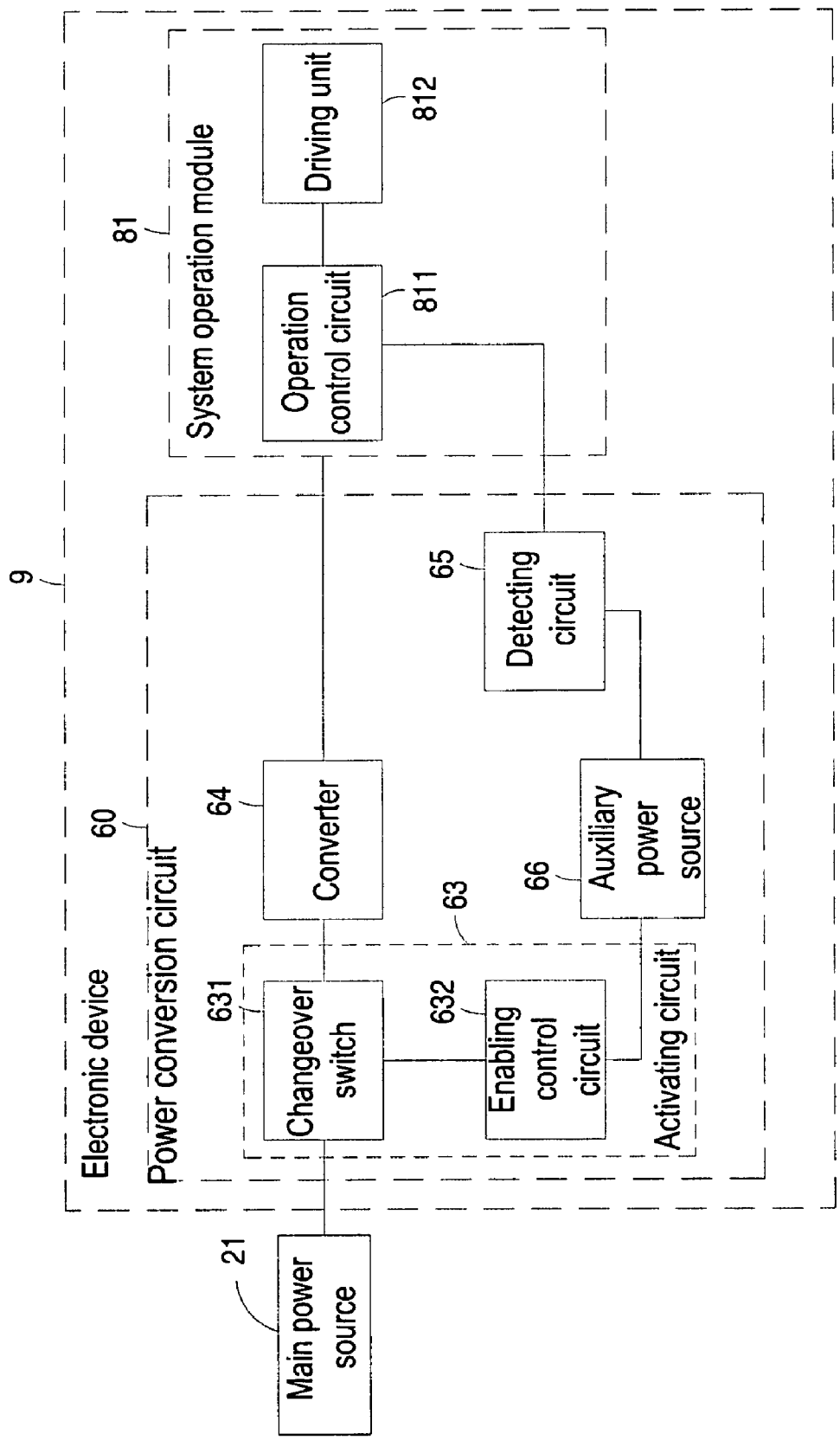
FIG. 9 is a schematic circuit block diagram of an electronic device according to an eighth preferred embodiment of the present invention.

FIG. 9 is a schematic circuit block diagram of an electronic device according to an eighth preferred embodiment of the present invention. In this embodiment, the detecting circuit 65 of the power conversion circuit 60 is also connected to the operation control circuit 811 of the system operation module 81, so that the on triggering signal or the off triggering signal may be transmitted from the driving unit 812 to the detecting circuit 85. The layout configurations, functions and operation principles of the activating circuit 83, the converter 84 and the auxiliary power source 86 are similar to those shown in FIG. 8, and are not redundantly described herein.

From the above description, the power conversion circuit of the present invention can reduce power loss when the main power source is disconnected from the load. If the load is disconnected from the power conversion circuit, the converter is disenabled such that the first power signal provided by the main power source fails to be converted into the second power source; or the converter is disconnected from the main power source such that the first power signal fails to be transmitted to the power conversion circuit. Therefore, unnecessary power consumption is avoided. Furthermore, when the power conversion circuit of the present invention is included in an electronic device, the converter is disenabled or the converter is disconnected from the system operation module when the system operation module is not in use. As a consequence, the electronic device can meet the requirements of low power consumption, low power loss and high performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit for converting a first power signal from a power source into a second power signal required for a load, said power conversion circuit comprising:
   a driving circuit for determining whether said load is connected with or disconnect from a converter, and driving an auxiliary power source;
   said converter electrically connected to said power source for receiving said first power signal and converting said first power signal into said second power signal;
   an activating circuit connected to said converter for enabling or disenabling said converter to convert said first power signal into said second power signal; and
   said auxiliary power source electrically connected to said activating circuit and said driving circuit, and driven by said driving circuit to issue either a first control signal to said activating circuit if said load is connected with said power conversion circuit or a second control signal to said activating circuit if said load is disconnected from said power conversion circuit, wherein in response to said first control signal, said first power signal is converted into said second power signal by said converter and said second power signal is transmitted to said load, and in response to said second control signal, said converter is disenabled so as to reduce power loss of said first power signal.

2. The power conversion circuit according to claim 1 wherein said first power signal is an AC power signal, said second power signal is a DC signal, and said converter is an AC-to-DC converter.

3. The power conversion circuit according to claim 1 wherein said load is a notebook computer and said auxiliary power source is a battery.

4. The power conversion circuit according to claim 1 wherein said driving circuit is a detecting circuit connected to said converter and said load for detecting whether said load is either connected with or disconnected from said converter, thereby driving said auxiliary power source to issue said first control signal or said second control signal.

5. The power conversion circuit according to claim 1 wherein said driving circuit is a mechanical changeover switch, which is manually switched in either an on status or an off status, thereby driving said auxiliary power source to issue said first control signal or said second control signal.

6. The power conversion circuit according to claim 1 wherein said activating circuit comprises:
   a changeover switch connected with said converter; and
   an enabling control circuit electrically connected to said changeover switch and said auxiliary power source for controlling on/off statuses of said changeover switch in response to said first control signal or said second control signal from said auxiliary power source.

7. A power conversion circuit for converting a first power signal from a power source into a second power signal required for a load, said power conversion circuit comprising:
   a driving circuit for determining whether said load is connected with or disconnect from a converter, and driving an auxiliary power source;
   an activating circuit for receiving said first power signal;
   said converter electrically connected to said activating circuit for converting said first power signal into said second power signal; and
   said auxiliary power source electrically connected to said activating circuit and said driving circuit, and driven by said driving circuit to issue either a first control signal to said activating circuit if said load is connected with said power conversion circuit or a second control signal to said activating circuit if said load is disconnected from said power conversion circuit, wherein in response to said first control signal, said first power signal is transmitted to said converter through said activating circuit to be converted into said second power signal by said converter and said second power signal is transmitted to said load, and in response to said second control signal, said activating circuit is disconnected from said converter so as to reduce power loss of said first power signal.

8. The power conversion circuit according to claim 7 wherein said first power signal is an AC power signal, said second power signal is a DC signal, and said converter is an AC-to-DC converter.

9. The power conversion circuit according to claim 7 wherein said load is a notebook computer and said auxiliary power source is a battery.

10. The power conversion circuit according to claim 7 wherein said driving circuit is a detecting circuit connected to said converter and said load for detecting whether said load is either connected with or disconnected from said converter, thereby driving said auxiliary power source to issue said first control signal or said second control signal.

11. The power conversion circuit according to claim 7 wherein said driving circuit is a mechanical changeover switch, which is manually switched in either an on status or an off status, thereby driving said auxiliary power source to issue said first control signal or said second control signal.

12. The power conversion circuit according to claim 7 wherein said activating circuit comprises:
a changeover switch connected to said power source and said converter; and
an enabling control circuit electrically connected to said changeover switch and said auxiliary power source for controlling on/off statuses of said changeover switch in response to said first control signal or said second control signal from said auxiliary power source.

13. An electronic device comprising:
a system operation module; and
a power conversion circuit electrically connected to said system operation module for converting a first power signal from a power source into a second power signal required for said system operation module,
wherein said power conversion circuit comprising a converter electrically connected to said power source for receiving said first power signal and converting said first power signal into said second power signal, a driving circuit for detecting whether said system operation module is in either an operating mode or a suspending mode and driving an auxiliary power source, an activating circuit connected with said converter, and an said auxiliary power source electrically connected to said activating circuit and said driving circuit, said auxiliary power source being driven by said driving circuit to issue either a first control signal to said activating circuit if said system operation module is in said operating mode or a second control signal to said activating circuit if said system operation module is in said suspending mode, wherein in response to said first control signal, said first power signal is converted into said second power signal by said converter and said second power signal is transmitted to said system operation module; and in response to said second control signal, said converter is disenabled or said activating circuit is disconnected from said converter.

14. The electronic device according to claim 13 wherein said first power signal is an AC power signal, said second power signal is a DC signal, and said converter is an AC-to-DC converter.

15. The electronic device according to claim 13 wherein said auxiliary power source is a battery.

16. The electronic device according to claim 13 wherein said activating circuit comprises:
a changeover switch connected with said converter; and
an enabling control circuit electrically connected to said changeover switch and said auxiliary power source for controlling on/off statuses of said changeover switch in response to said first control signal or said second control signal from said auxiliary power source.

17. The electronic device according to claim 13 wherein said activating circuit is connected to said power source and said converter and comprises:
a changeover switch connected to said power source and said converter; and
an enabling control circuit electrically connected to said changeover switch and said auxiliary power source for controlling on/off statuses of said changeover switch in response to said first control signal or said second control signal from said auxiliary power source.

18. The electronic device according to claim 13 wherein said system operation module comprises:
a driving unit; and
an operation control circuit triggered by said driving unit, thereby controlling operation of said system operation module.

19. The electronic device according to claim 18 wherein said driving circuit is a detecting circuit electrically connected to said operation control circuit of said system operation module for detecting whether said system operation module is in either said operating mode or said suspending mode, thereby driving said auxiliary power source to issue said first control signal or said second control signal.

20. The electronic device according to claim 13 wherein said driving circuit is a detecting circuit electrically connected to said converter and said system operation module for detecting whether said system operation module is in either said operating mode or said suspending mode, thereby driving said auxiliary power source to issue said first control signal or said second control signal.

* * * * *